United States Patent
Ganasan et al.

(10) Patent No.: US 8,966,291 B2
(45) Date of Patent: Feb. 24, 2015

(54) METHOD AND APPARATUS FOR REDUCING DYNAMIC POWER WITHIN SYSTEM-ON-A-CHIP ROUTING RESOURCES

(75) Inventors: Jaya Prakash Subramaniam Ganasan, Youngsville, NC (US); Martyn Ryan Shirlen, Wake Forest, NC (US)

(73) Assignee: QUALCOMM Incorporated, San Diego, CA (US)

( * ) Notice: Subject to any disclaimer, the term of this patent is extended or adjusted under 35 U.S.C. 154(b) by 424 days.

(21) Appl. No.: 12/977,553

(22) Filed: Dec. 23, 2010

(65) Prior Publication Data

US 2012/0166827 A1 Jun. 28, 2012

(51) Int. Cl.
*G06F 13/00* (2006.01)
*G06F 1/32* (2006.01)

(52) U.S. Cl.
CPC ............ *G06F 1/3203* (2013.01); *G06F 1/3253* (2013.01); *Y02B 60/1235* (2013.01)
USPC ........... 713/300; 713/100; 713/320; 713/321; 713/323; 713/324

(58) Field of Classification Search
USPC ................................. 713/100, 300, 320–324
See application file for complete search history.

(56) References Cited

U.S. PATENT DOCUMENTS

| | | | | |
|---|---|---|---|---|
| 7,257,637 | B2 * | 8/2007 | Takahashi et al. | 709/230 |
| 7,995,237 | B2 * | 8/2011 | Haikin et al. | 358/1.9 |
| 8,085,172 | B2 * | 12/2011 | Li et al. | 341/58 |
| 2006/0072593 | A1 * | 4/2006 | Grippo et al. | 370/409 |
| 2007/0073770 | A1 * | 3/2007 | Morris et al. | 707/104.1 |
| 2008/0140694 | A1 * | 6/2008 | Mangla | 707/102 |
| 2008/0218780 | A1 * | 9/2008 | Shimbaru | 358/1.9 |
| 2009/0006104 | A1 * | 1/2009 | Sung et al. | 704/500 |
| 2009/0193159 | A1 * | 7/2009 | Li et al. | 710/35 |
| 2009/0193319 | A1 | 7/2009 | Shen et al. | |
| 2010/0002669 | A1 | 1/2010 | Wu | |
| 2010/0104008 | A1 * | 4/2010 | Bulusu et al. | 375/240.2 |
| 2010/0191536 | A1 * | 7/2010 | Sampat et al. | 704/500 |

OTHER PUBLICATIONS

Acquaviva, A. et al., "A Spatially-Adaptive Bus Interface for Low-Switching Communication", Proceedings of the 2000 International Symposium on Low Power Electronics and Design, 2000, pp. 238-240.
Mahesh M. N. et al., "Encoding Techniques for Low Power Address Buses", Center for Embedded Computer Systems, Department of Information and Computer Science, University of California, Irvine, CA 92697-3425, Feb. 4, 2010, pp. 1-20.
Yates, J. et al., "High Performance Embedded System Bus Encoding for Improved Low-Power Operation", ECE8823 High Performance Embedded Computing, Prof. Wayne Wolf, Georgia Institute of Technology, Atlanta, GA 30332, Apr. 25, 2008, pp. 1-9.

(Continued)

*Primary Examiner* — M Elamin
(74) *Attorney, Agent, or Firm* — Nicholas J. Pauley; Peter Michael Kamarchik; Joseph Agusta (57) ABSTRACT

A method for saving power in transmission of data across buses. By knowing the power characteristics of a bus and characteristics of data to be transmitted across the bus, the data can be encoded in such a fashion as to conserve system power over transmitting the same data in an unencoded format across the bus. The encoding method may be selected before transmission of the data across the bus, and may change depending on the data to be transmitted across the bus.

18 Claims, 7 Drawing Sheets

(56) References Cited

OTHER PUBLICATIONS

Shin and Choi, "Narrow Bus Encoding for Low Power Systems," School of Electrical Engineering, Seoul National University, Seoul 151-742, Korea, 2000 IEEE ISBN 0-7803-5974-7.

International Search Report and Written Opinion—PCT/US2011/066952—ISA/EPO—Apr. 24, 2012.

Lin et al., "Weight-based bus-invert coding for low-power applications", Proceedings Design Automation Conference, Proceedings of ASP-DAC, 7th Asia and South Pacific and the 15th International Conference on VLSI Design, Jan. 7, 2002, pp. 121-125, IEEE Computer Society, XP010588090, DOI: 10.1109/ASPDAC.2002.994897, ISBN: 978-0-7695-1441-3.

Stan et al., "Bus-Invert Coding for Low-Power I/O", IEEE Transactions on Very Large Scale Integration Systems (VLSI), Mar. 1, 1995, pp. 49-58, vol. 3, No. 1, IEEE Service Center, XP000500301, ISSN: 1063-8210, DOI: 10.1109/92.365453.

\* cited by examiner

| Attribute | Transform |
|---|---|
| 1  Data Type | 1 |
| 2  Data Characteristic | 2 |
| 3  Hamming Distance | 3 |
| 4  Weighted Hamming Distance | 4 |
| 5  Destination(s) | 5 |
| 6  Thread | • |
| 7  Task | • |
| 8  Stream ID | • |
| 9  DMA Channel ID | • |
| 10  Master/Sub-Master ID | N |

METHOD AND APPARATUS FOR REDUCING DYNAMIC POWER WITHIN SYSTEM-ON-A-CHIP ROUTING RESOURCES

FIELD OF DISCLOSURE

The teachings of the present disclosure relate generally to transmission of data over buses and in particular embodiments to transmission of data over busses in system on a chip (SOC) applications.

BACKGROUND

Reduction of power consumption is a common goal for electronic systems. It is, in general, desirable to reduce power consumed in the transmission of data across busses. Accordingly there is a need in the art for methods and apparatus for reducing power required for transmission of data over busses in system on a chip (SOC) applications.

The teachings of this disclosure are illustrated in terms of an integrated circuit having on chip bus interconnections between electronic units (EU) which reside on the integrated circuit. Electronic units on integrated circuits are commonly coupled to each other by busses. For the purposes of this disclosure a "bus" is defined as a signal conductor or a plurality of conductors used to couple electronic units and transfer data between electronic units. Also for the purposes of this disclosure "electronic unit" is defined to be electronic circuitry which is coupled to other electronic circuitry by one or more buses. As an example a microprocessor or computer (each an electronic unit) may be coupled to a floating point co-processor (another electronic unit) by a data bus.

Modern systems on a chip commonly have a plurality of electronic units coupled by a plurality of buses. Such interconnected systems resemble a quilt which different fabric pieces interconnected by stitches, hence a common term to describe such an interconnected system is "fabric."

Although the teachings of this disclosure are illustrated in terms of integrated circuits e.g. Systems On a Chip (SOC), the teachings are applicable in other areas. The teachings disclosed should not be construed to be limited to SOC designs or the illustrated embodiments. The illustrated embodiments are merely vehicles to describe and illustrate examples of the inventive teachings disclosed herein.

SUMMARY OF THE DISCLOSURE

It is understood that other embodiments of the teachings herein will become apparent to those skilled in the art from the following detailed description, wherein various embodiments of the teachings are shown and described to illustrate aspects of the teachings herein. As will be realized, the teachings herein are capable of other and differing embodiments without departing from the spirit and scope of those teachings. Accordingly, the drawings and detailed description are to be regarded as illustrative in nature and not as restricting the inventive concepts disclosed in those embodiments.

In a first embodiment a method of communicating data between electronic units is disclosed. The method comprises providing data to a first electronics unit, providing a plurality of transforms, each transform associated with at least one encoding, selecting between data transforms based on the data, transforming the data according to the selected transform's at least one encoding to form a transformed data; and providing the transformed data to a bus for transmission to a second electronics unit.

In another embodiment an apparatus for communicating data between electronic units is disclosed. The apparatus comprises means for providing data to a first electronics unit, means for providing a plurality of transforms, each transform associated with at least one encoding, means for selecting between data transforms based on the data accepted, means for transforming the data according to the selected transform's at least one encoding to form a transformed data, means for providing the transformed data to a bus for transmission to a second electronics unit, means for transmitting the transformed data over a bus to a second electronics unit, means for accepting the transformed data from the bus in a second electronics unit; and means for inverse transforming the transformed data thereby recreating the data.

In a further embodiment an apparatus for communicating data between electronic units is disclosed. The apparatus comprises a first electronics unit having a data source, a profiler which provides a plurality of transforms, each transform associated with at least one encoding, and selects between data transforms based on the data, a transform selector, which selects a transform to encode the data forming transformed data, and an output for providing the transformed data to a bus for transmission to a second electronics unit.

BRIEF DESCRIPTION OF THE DRAWINGS

Various aspects of the teachings of the present disclosure are illustrated by way of illustration and example, and not by way of limitation, in the accompanying drawings, wherein.

DETAILED DESCRIPTION

The detailed description set forth below, along with the appended drawings, is intended to describe and illustrate the teachings of the present disclosure. The descriptions and illustrations herein are not intended to represent the only embodiments or configurations in which such teachings may be practiced. The detailed description includes specific details for the purpose of providing a thorough understanding of the teachings by way of illustration and as such they should not be construed as limiting the inventive teachings to the examples given. It will be apparent to those skilled in the art that the teachings of the present disclosure may be practiced in a variety of ways without departing from the spirit and scope of the inventive teachings herein.

In some instances components are shown in block diagram form in order to avoid obscuring the concepts of the present disclosure. Additionally components, normally present in such embodiments, may not be shown in order to prevent obscuring the inventive teachings illustrated.

Additionally a glossary of terms, as used herein, and their meaning is included below for the sake of clarity.

Glossary:

Attribute. The term attribute shall refer to one or more characteristics of the data. Accordingly attribute is a superset of the term characteristic.

Characteristic. Characteristic shall mean a single facet of the data, e.g. destination of the data.

Beat. A beat is bus transaction that transmits a chunk of data. Much like a drum or heart beat a bus transaction beat "beat" is the smallest indivisible transmission of data across a bus. Each beat may transfer one or more bits of information, depending on the bus configuration.

Bus. A bus is defined as a signal conductor or a plurality of conductors used to couple electronic units and transfer data between electronic units. A bus may contain one or more conductors and may communicate data in a serial or parallel configuration between Electronic Units.

Electronic Unit. An electronic unit is defined to be electronic circuitry which is coupled to other electronic circuitry by one or more buses. EU is an abbreviation for electronic unit.

Encoding. Encoding is defined as substituting one data pattern for another.

Fabric. Modern systems on a chip commonly have a plurality of electronic units coupled by a plurality of buses. Such interconnected systems resemble a quilt with various fabric pieces interconnected by stitches, hence a common term to describe such an interconnected system is "fabric."

Hamming Distance. The Hamming distance of data is the total number of logic transitions on a bus when the data is transmitted on the bus.

Inverse Transforming. The process of applying an inverse transform to transformed data in order to retrieve the data.

Reverse Transformation. Reverse transformation refers to a transformation applied to data to undo a first transformation to that data in order to retrieve the data prior to the first transformation.

Transformed Data. Transformed data refers to data that has been changed in some fashion to reduce the power required to transmit it over a bus.

Transformation. A transformation refers to applying one or more encodings to data.

Weighing. Weighing or weighting is defined as taking into account the power consumed to maintain a 1 state coupled to a bus as compared with the power required to maintain a 0 state coupled to a bus.

End of Glossary.

Figure 1:
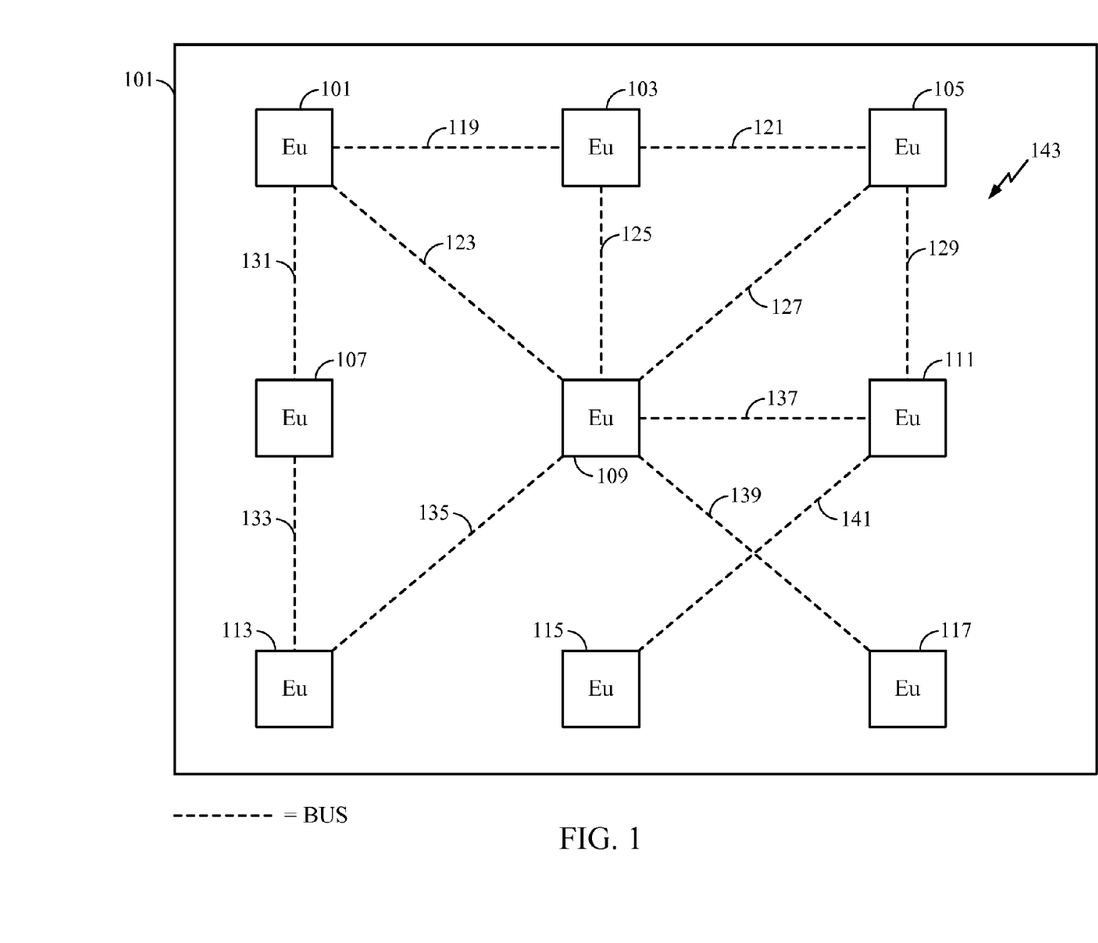
FIG. 1 is a graphical illustration of a SOC (System On a Chip) interconnection fabric 143 illustrating electronic units (EU) 101, 103, 105, 107, 109, 111, 113, 115, and 117 coupled by means of buses (B) 119, 121, 123, 125, 127, 129, 131, 133, 135, 137, 139, and 141.

FIG. 1 is a graphical illustration of an exemplary integrated circuit 100 employing a SOC (System on a Chip) interconnection fabric "fabric" 143. The illustrative fabric 143 comprises Electronic Units (EU)101 through 117, coupled using buses 119 through 141.

Buses transmit and receive data in discrete chunks comprising one or more bits. A bus transaction will commonly communicate successive chunks of data in sequence. For the purposes of this disclosure each bus transaction that transmits a chunk of data is termed a beat. Much like a drum or heart beat a bus transaction beat "beat" is the smallest indivisible transmission of data across a bus. Each beat may transfer one or more bits of information, depending on the bus configuration.

Figure 2:
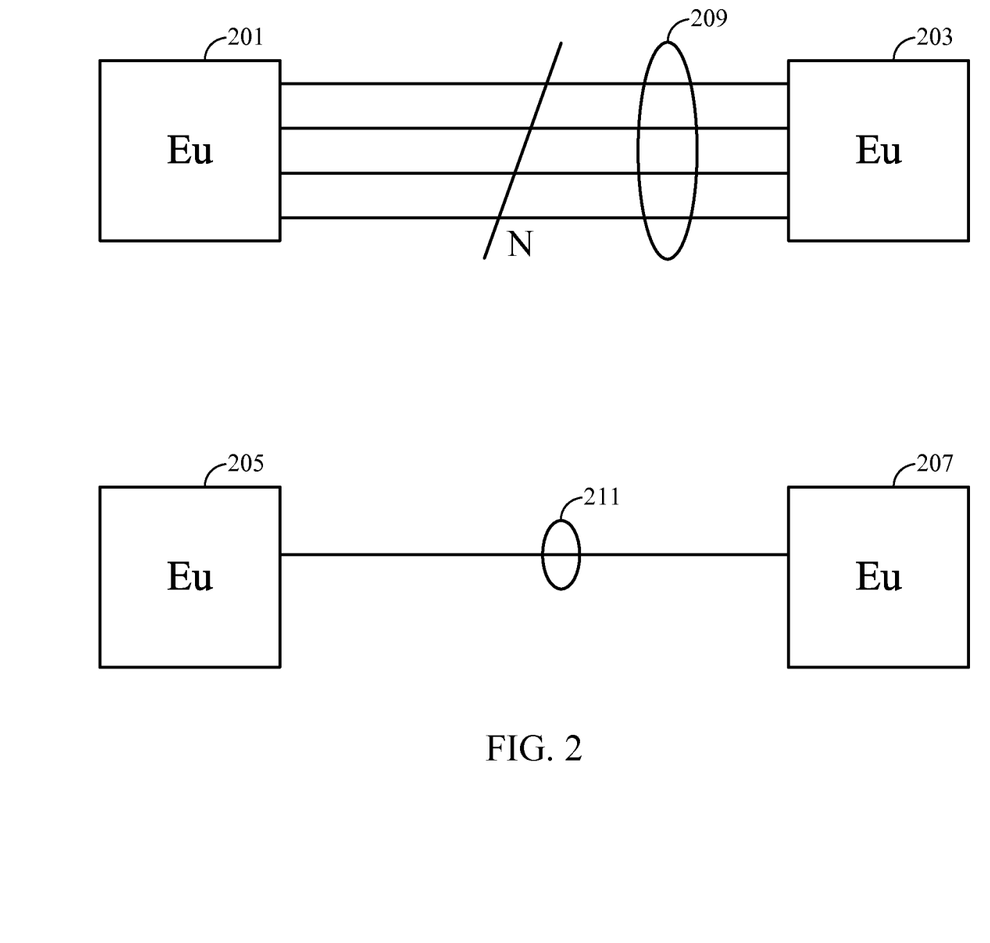
FIG. 2 is a graphical illustration of serial and parallel bus configurations.

FIG. 2 is a graphical illustration of serial and parallel bus configurations. In a parallel configuration electronic unit EU 201 is coupled to EU 203 via bus 209. Bus 209 comprises N conductors, though there may be additional control conductors, and can communicate one N bit word between EU 201 and EU 203 per beat. In a serial configuration EU 205 can communicate with EU 207 over serial bus 211. A serial bus is generally a single conductor, though there may be additional control conductors that communicate one bit of information per beat between electronic units. Data transmitted across buses commonly comprises a plurality of beats.

Both types of buses, as well as variations thereof, may benefit from the teachings herein. For the sake of clarity, and to avoid unnecessary obfuscations of the teachings herein, common structures such as control signals have been omitted. Throughout this disclosure common and well known structures not necessary for the understanding of the teachings herein are also omitted so that the inventive teachings herein are not obscured.

Figure 3:
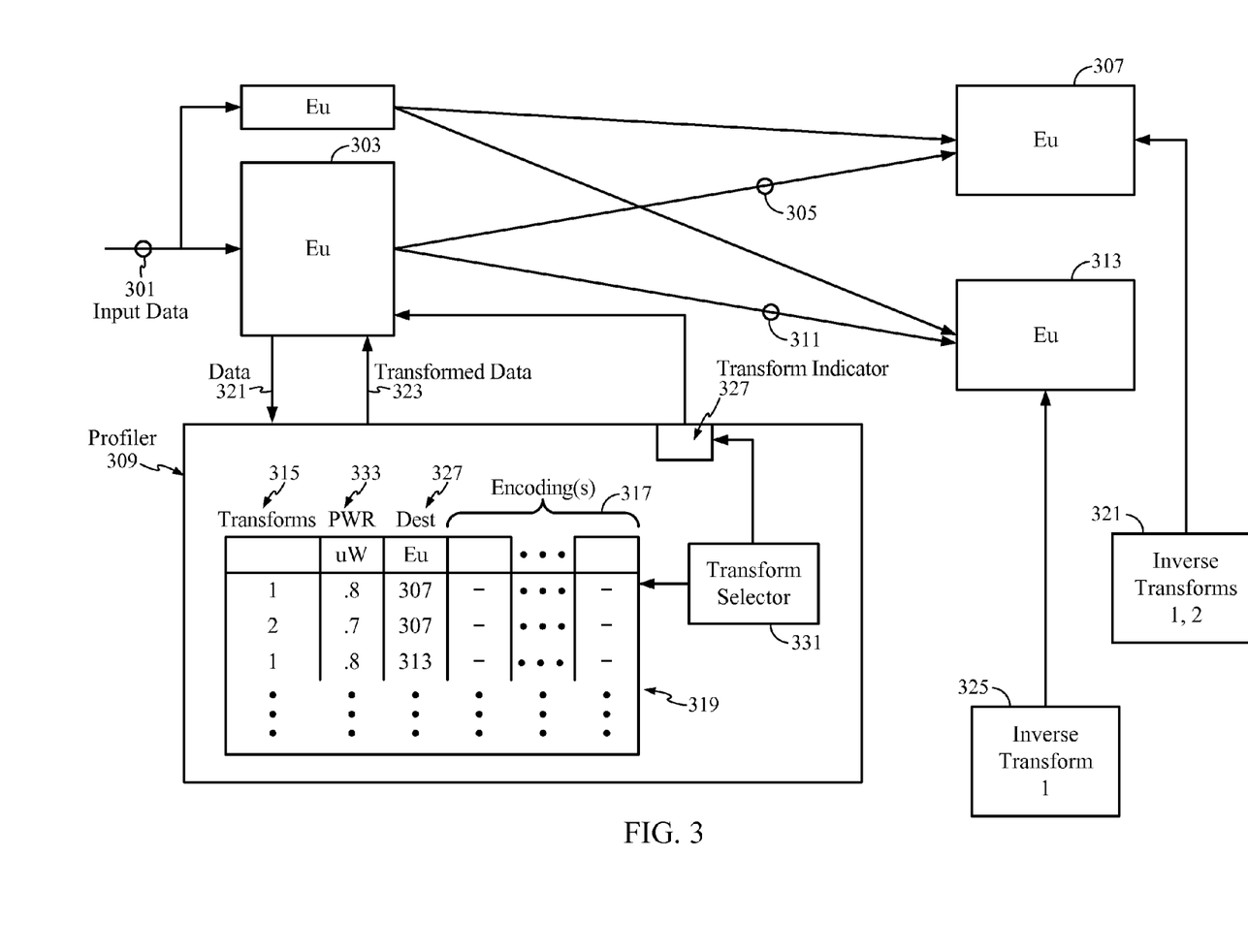
FIG. 3 is a graphical illustration of an embodiment of the invention.

FIG. 3 is a graphical illustration of an embodiment of the invention. In FIG. 3 input data 301, comprising a plurality of beats, is accepted by electronic unit 303. Although the present embodiment provides an input for accepting data, alternately electronic unit 303 may generate its own data. The source of the data is immaterial as long as it is provided to the electronic unit 303, whether externally provided or internally generated the teachings of the present disclosure are equally applicable. Electronic unit 303 may operate on the input data 301 to create data to be transmitted "data" 321, electronic unit 303 may itself provide the data to be transmitted "data" 321, or electronic unit 303 may simply pass on the input data 301 in which case data 321 may be essentially unaltered. In any case data 321 is transformed into transformed data 323, using a transform 315 from profiler 309. The transformed data 323 will then be transmitted across bus 305 to electronic unit 307. Transmitting the transformed data from EU 303 to EU 307 will require less power consumption than transmitting the (untransformed) data 301 from EU 303 to EU 307. A transform indicator 327 may be included with the transformed data 323 to inform the receiving electronic unit of the transform used to transform the data 321. For the purposes of this application a transform includes one or more data encodings 317, which can be applied to data 321 to form transformed data 323.

In the present embodiment EU 303 provides data 321 to profiler 309. Profiler 309 selects a transform from profile table 319. Profiler 309 is so named because it can categorize data using a variety of characteristics and then use that categorization to transform the data 321. The profiler 309 can use these various characteristics to decide which transform 315 to select to transform data 321. Additionally the profiler may use a heuristic determination to select a transform. That is the profiler 309 may compute several transforms then evaluate a power indicator to compare the power performance of the several transforms. In the present example the characteristic or attribute that is being used to select the transform of the data 321 is the destination of the transformed data 323. When the transformed data 323 is transmitted from its source to its destination the transmission will consume less power than if the data had been transmitted without the transformation. For the purposes of this disclosure the term characteristic shall mean a single facet of the data, in the present example the destination of the transformed data. The term attribute shall refer to one or more characteristics of the data and accordingly attribute is a superset of the term characteristic.

If data is transformed it may need to be reverse transformed at its destination to retrieve the original data 321. Accordingly an inverse transform table may be included at the destination electronic unit(s). Inverse transform table 321 indicates that EU 307 has inverse transforms for transform 1 or 2, while inverse transform table 325 indicates that EU 313 has inverse transforms for transform 1 only.

In the present example if EU 303 is going to transmit the transformed data 323 to EU 307 transform selector 331 can choose from either transform 1 or transform 2 as both are listed as transforms 315 that may be used if the transformed data's destination (Dest) 327 is EU 307. If EU 313 is the destination for the transformed data 323 only transform 1 can be used as only transform 1 listed as in profile table 319 as an acceptable transform when EU 313 is the destination for the transformed data 323. If EU 307 is the only destination for the transformed data transform 2 will be selected as the power consumed 333, according to the profile table 319 will be 0.7 microwatts, whereas transform 1 will consume 0.8 microwatts. If however the transformed data were destined for both EU 307 and EU 313 transform 1 may be selected, even though it requires more power since both transforms can be used to transmit transformed data to EU 307 and EU 313 and EU 303 is coupled to EU 307 and EU 313 by buses 305 and 311 respectively. The profile table in the present example uses microwatts as an indicator of power. However such definitive numbers need not be used, only an indicator of relative transmission power consumed is needed so that the various transforms may be compared for power efficiency.

The process of applying an inverse transform to the transformed data in order to retrieve the data, for the purposes of this application shall be referred to as inverse transforming. In this embodiment the profiler used the characteristic of destination 327 to decide which encoding would be used to save transmission power. EU 313 only has the inverse transform, necessary to inverse transform data transformed by transform number 1, present in its inverse profiler 325. In such a case there is no need to indicate which transform 315 was used as EU 313 can only apply an inverse transformation to data encoded with transform 1. In the case of EU 307 however it can inverse transform data transformed with either transform 1 or transform 2 both of which are present in its inverse profiler 321. In such a case an indication of which transform (1 or 2) was used may be transmitted along with the transformed data to EU 307.

The encoding(s) to produce the transforms 315 can be selected in a variety of ways. In one example the encoding is selected so that the transitions of the data bits in successive beats of the transmission exhibit the minimum cumulative Hamming distance between all the successive data bits in the data stream. This is done because changing the state of a data bit on a particular bus conductor commonly consumes more power than that transmitting the same data bit successively, as switching between states tends to consume power. When the same data bit value is transmitted twice, the value of that data bit is maintained and power is not lost switching between states. Simply put, for the sake of illustration, transmitting two successive "1" values over a bus takes less power than transmitting a "1" value followed by a "0" value because to transmit a "1" followed by a "0" consumes power in switching states from a "1" to a "0". For the purposes of this disclosure the total number of transitions on each data bus conductor, added up over all the conductors in the bus and all the data transmitted, will be designated as the Hamming distance of the data. The smallest number for the Hamming distance of the data to be transmitted will generally result in the fewest bus transitions and the least power used.

The Hamming distance of a transmission may not be the only factor to be considered however. A value of one state on a bus may consume more power than the value of another state on a bus. As an example assume that a one bit serial bus is transmitting an 8 beat message containing 8 bits. Further assume that maintaining a "1" state consumes 20% more power than maintaining a "0" state, for example due to leakage. Transmitting a data sequence of 1,0,0,0,0,0,0,0 will consume less power than transmitting 0,1,1,1,1,1,1,1 even though the Hamming distance is the same for both sequences. This consideration will be referred to as weighting or weighing.

For example consider bus invert coding. Commonly in bus invert coding an extra bus conductor may be used to transmit a bus invert bit to indicate if the data on the bus has been inverted or not. In such a case 1,0,0,0,0,0,0,0 transmitted in a first beat followed by 0,1,1,1,1,1,1,1 transmitted in a second beat, could be transmitted as 1,0,0,0,0,0,0,0 (bus invert=0, i.e. not inverted) followed by 1,0,0,0,0,0,0,0 (bus invert=1, i.e. inverted). In such a case only one bit (the bus invert bit) would switch instead of having 8 bits switch state.

Weighted bus invert coding is somewhat different than bus invert coding in that bus invert coding would regard the pattern 1,0,0,0,0,0,0,0 as equivalent to 0,1,1,1,1,1,1,1. However in weighted bus invert coding the fact that a 1 state consumes more power than a 0 state would be taken into account and the pattern 1,0,0,0,0,0,0,0 would be preferred over the pattern 0,1,1,1,1,1,1,1, which will consume more energy in transmission due to the weighting of the power in the different states.

Figure 4:
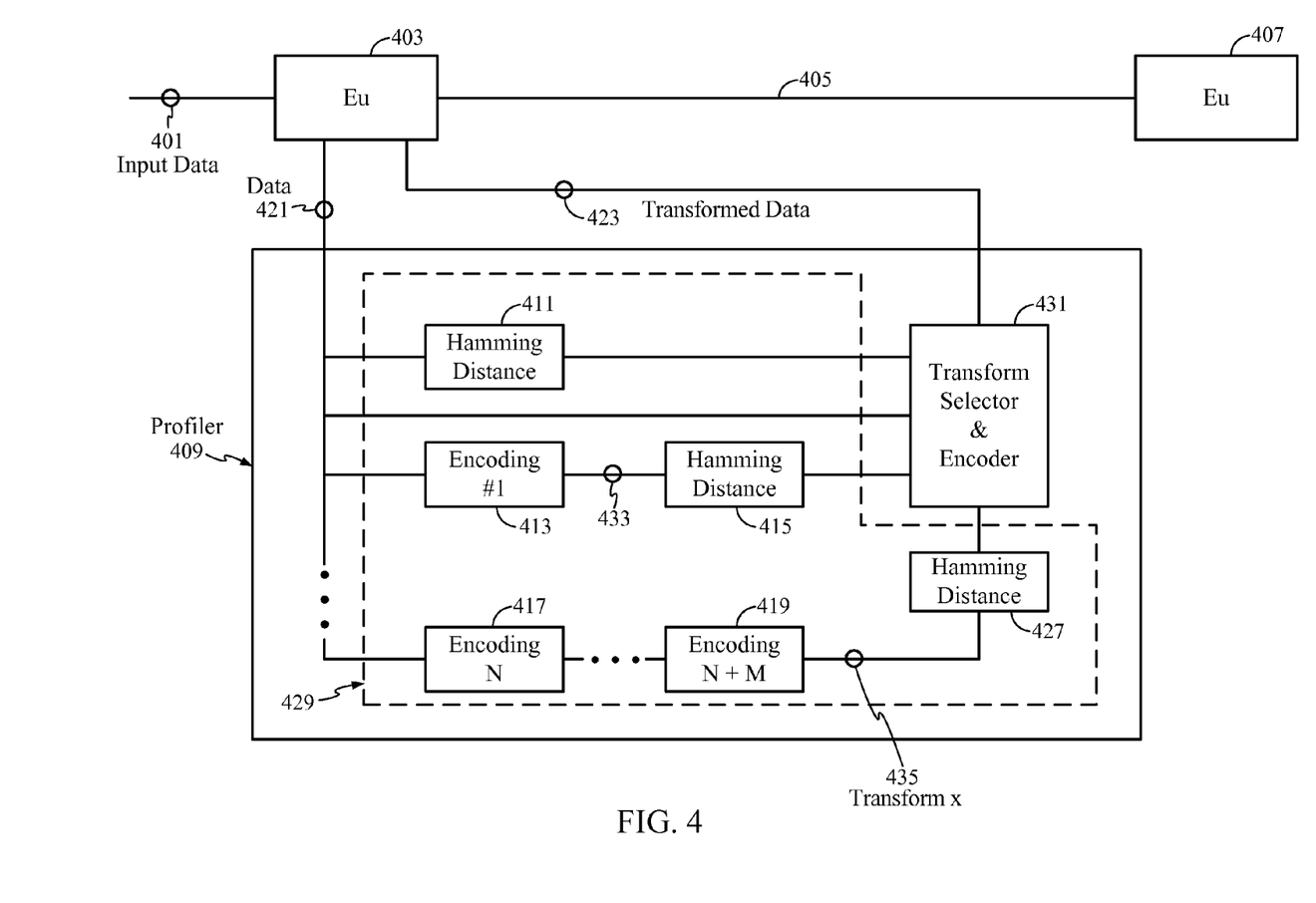
FIG. 4 is a graphical illustration further illustrating an embodiment of the profiler illustrated in FIG. 3.

FIG. 4 is a graphical illustration depicting an embodiment of a profiler 409 having a similar function to the profiler 309 illustrated in FIG. 3. In FIG. 4 however the profiler does not act upon the characteristic of data destination to determine the best encoding transform to use for transmission, instead it examines the incoming data and a plurality of transforms to determine which is the most beneficial encoding to apply to transform the data for low power transmission. In the illustration of FIG. 4 the Hamming distance of various transforms is examined.

Input data 401 is provided to EU 403, either from an external source or from within EU403. EU 403 provides data to be transmitted 421, which may or may not be the same as Input data 401, to profiler 409. Data 421 is coupled to the Hamming Distance analyzer 411 which determines the Hamming distance of the data 421 without encoding. The Hamming distance of the unencoded data 421 is provided to transform selector and encoder 431 in order to provide a baseline indicator of how much power will be used if the unencoded data 421 is transmitted using bus 405. If it is known that transformed data will be better than untransformed data this baseline indicator may be dispensed with and only relative comparisons between transforms used. The Data 421 is also coupled to a first encoding unit 413 where it is encoded. The Hamming Distance analyzer 415 determines the Hamming distance of the data 421. There are no successive encodings after the 413 encoding so encoding 1 forms the complete transform.

The Hamming Distance analyzer 409 determines the Hamming distance of the data 421 once it is transformed with encoding #1, forming transform 1. A transform may comprise any number of encodings as represented in FIG. 4 where data 421 is provided to encoding N 417 and is then provided to M successive encodings 419 forming "transform X" 435 prior to being provided to the Hamming distance analyzer 427, which will determine the Hamming distance of the data 421 after it has been transformed using transform X 435. The Hamming distance using transform X 435 is further coupled into transform selector and encoder 431. Transform selector and encoder 431 may then select the transform from those provided by the transform analyzer 429 based upon which transform provides the lowest number for the Hamming distance as an indicator of which transform will result in the best data transmission power consumption. Once transform selector and encoder 431 has selected the transform which results in the lowest Hamming distance, as a power indicator, the transform selector and encoder 431 can in turn can use that encoding to transform the data into a form 423 which will require the least amount of power to transmit From EU 403 across bus 405 to EU 407.

Other characteristics of the data or combination of characteristics can be considered along with Hamming distance. For the purpose of this disclosure the term attribute encompasses one or more characteristic(s) of data. For example the type of data such as speech, text, video, etc. can be a characteristic, the destination of the data, the latency requirements of the data, can be considered as can the average numerical value of the data or any other attribute may be considered for use in encoding. Since power consumption may not be the sole consideration other mitigating factors such as latency requirements for the data may actually prevent the lowest power transform from being selected. In the present example the profiler 409 is shown as a separate entity for convenience. It, of course, may be integrated as part of EU 403, or it may also be external to the SOC integrated circuit entirely. The profiler may exist in a test environment and the resulting transforms for different attributes stored on the chip containing the electronics units or elsewhere. For example a test environment may determine that all types of video data are best encoded, on average, by a particular encoding scheme. Additionally, in a further embodiment, the work of the profiler 409 may be done externally and provided to EU 403 as part of the data received from Data In 401. Throughout this disclosure the term transformed data will refer to data that has been changed in some fashion.

Figure 5:
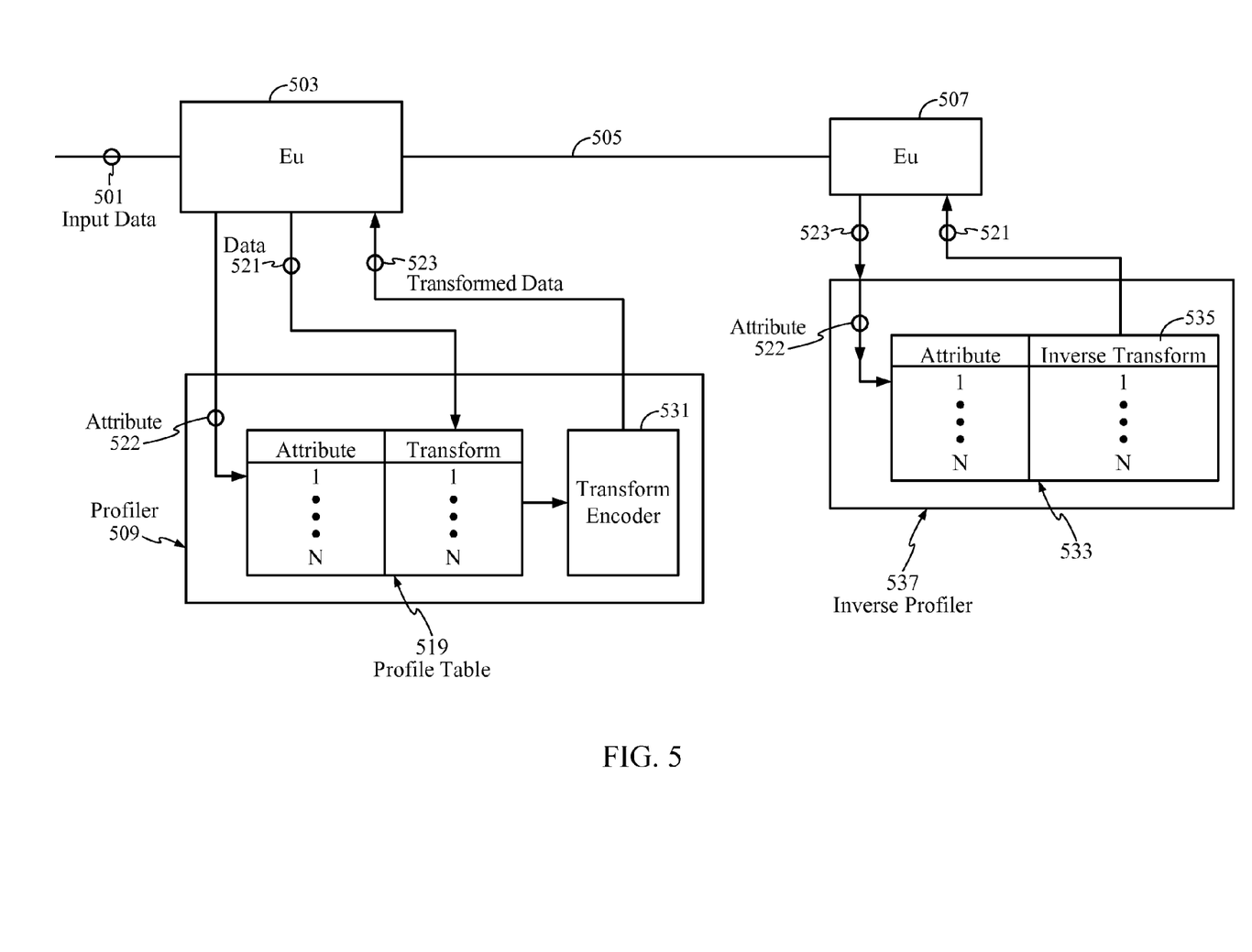
FIG. 5 is graphical illustration of an embodiment of the invention using predetermined attributes.

FIG. 5 is graphical illustration of an embodiment of the invention using predetermined attributes. Such attributes as type of data (e.g. whether the data were video, voice, picture, ASCII data, etc.) could be used. Such characteristics may be provided along with input data 501. Various encoding techniques known in the art can be used to create transforms to minimize Hamming distance and therefore power consumed in data transmissions across buses. These transforms could be determined by analysis, as illustrated in FIG. 4, delivered with the data coupled to Data In 501, determined in a test environment, programmed as part of an initial coding or otherwise.

In FIG. 5 profiler 509 contains a profile table 519 comprising attribute(s) 522 and associated transforms stored in the profile table 519. In the present example attribute(s) 522 could indicate any of N attributes corresponding to any of N (or less as some transforms may be used for multiple attributes, or sets of attributes) transforms from profile table 519 could be selected. Transform Encoder 531 may then apply the appropriate transform to the data plus attribute 521 resulting in transformed data 523 which EU 503 could provide to bus 505 for transmission to EU 507.

An inverse profiler 537 could then be provided to EU 507 for inverse transforming transformed data 523 and recreating data 521. Inverse profile table 533 contains attributes and their associated inverse transforms. Attribute 522 may indicate which inverse transform 535 can be used to inverse transform transformed data 523 to recreate data 521. Attribute 522 may be included with the transformed data 523 which is provided to EU 507.

Figure 6:
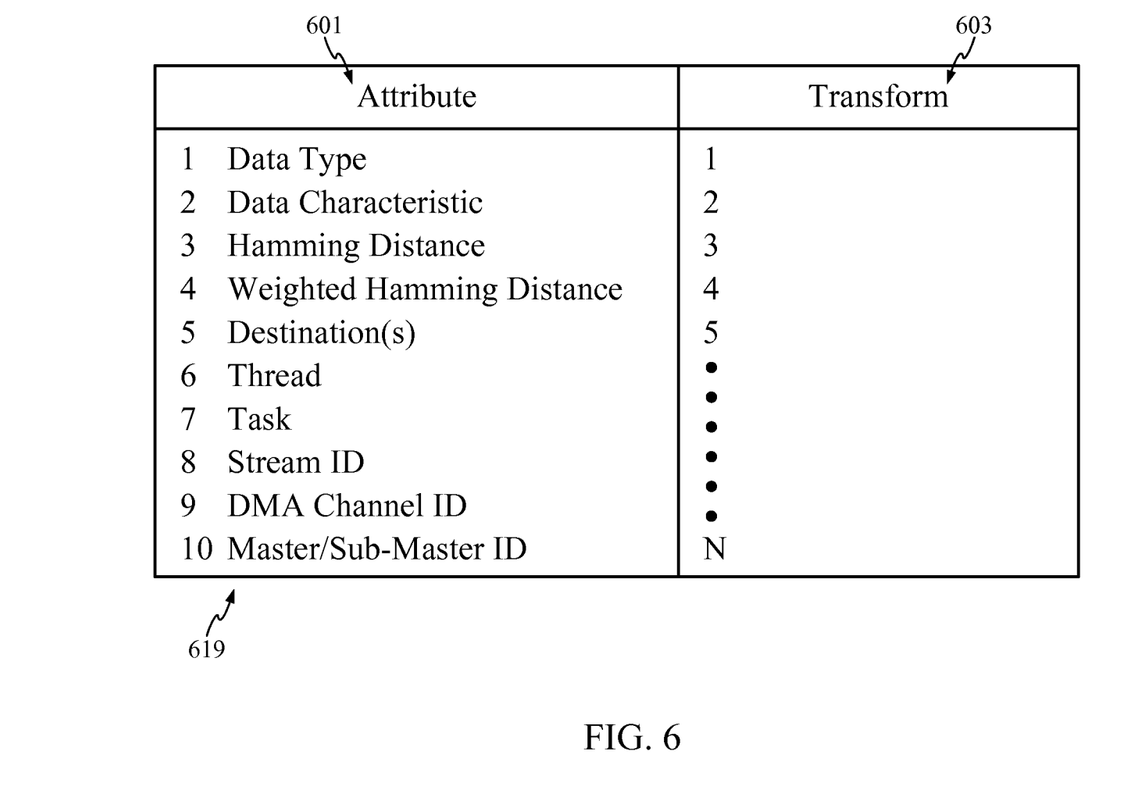
FIG. 6 is a graphical illustration of an attribute table, illustrating some of the attributes which may be used in embodiments of the invention.

FIG. 6 is a graphical illustration of a profile table 619, illustrating some of the attributes 601 which may be used in embodiments of the invention to indicate various transforms to apply to data before transmission to another electronic unit(s). The attributes listed, that is Data Type, Data Characteristic, Hamming Distance, Weighted Hamming Distance, Destination(s), Thread, Task, Stream ID, DMA Channel ID, and Master/Sub-Master ID are examples of attributes that may be considered. They are, of course, not the only attributes which may be considered. Additionally although the profile table 619 illustrates an attribute and a corresponding encoding those skilled in the art will realize that there is nothing preventing such a profile table from using more than one attribute to indicate an encoding. Attributes may be mixed and matched with transforms as the application permits.

As illustrated in FIG. 6 some attributes that may be considered when developing data transforms to save power when transmitting data over a bus:

1. Data type. Is the data voice, video, files, etc?
2. Data characteristic. Are there repeated patterns or runs of the same pattern?
3. Hamming distance. What is the Hamming distance between successive beats or multiple successive beats when different encodings are used?
4. Weighted Hamming distance. Hamming distance taking into account the data is in a one or zero state, if the power to maintain a one or zero state is different.
5. Destination of the data. Where is it going? Is there more than one destination for the data? Which inverse transform(s) are available at the destination(s)? Is there a characteristic of data being sent to a specific destination?
6. Thread. Is the data being generated by a particular execution thread? Does that thread generate data having certain characteristics?
7. Is a particular task generating the data? Does the task generate data having certain characteristics?
8. Stream ID. Is the data stream identifiable and of use for encoding? For example does the data represent a voice data stream or a video data stream that may be transformed effectively?
9. DMA channel ID. The DMA channel that is providing the data is identified since different DMA channels can produce data with different characteristics.
10. The Master/Sub Master ID which provided the data is identified.

This list of attributes is not comprehensive. Any attribute which may lead to a transformed data requiring less power to transmit over a bus may be considered and used for the creation of transforms. Additionally attributes may be combined so that a first transform is used when data has a first attribute and a second transform is used when the data has a first attribute and a second attribute.

Figure 7:
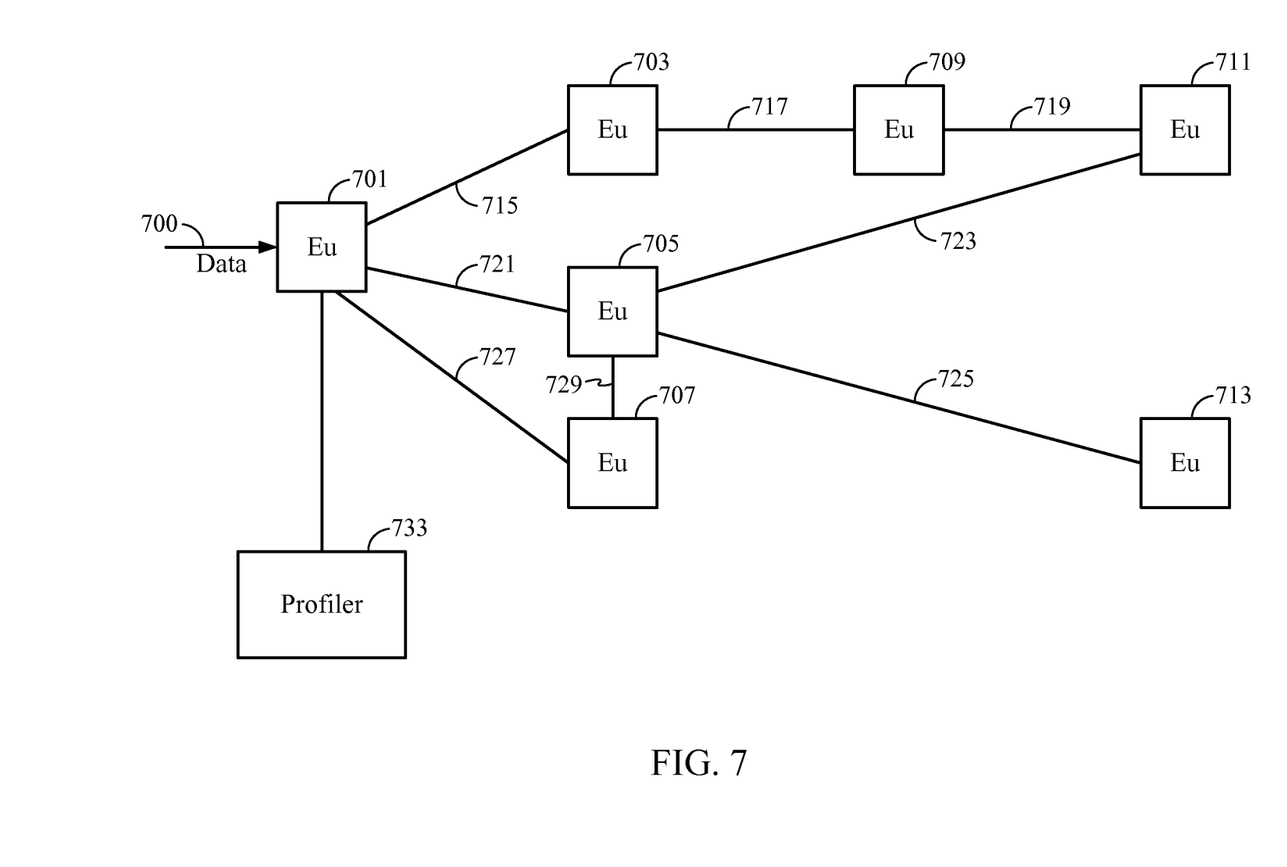
FIG. 7 is a graphical illustration of an exemplary transfer using an embodiment of the invention.

FIG. 7 is a graphical illustration of an exemplary transfer using an embodiment of the invention. FIG. 7 illustrates multiple Electronic Units, EU 701 through EU 713, coupled by buses 715 through 729. In FIG. 7 data 700 which is provided to EU 701 has a final destination of EU 711. The profiler 727 may select two different paths to 711. As an example assume that buses 715, 717, and 719 have the attributes of being relatively slow and power efficient busses each consuming only 20% of the power that high speed busses 721 and 723 consume. Assume further that the data being transferred to EU 711 is speech. If the speech data is a phone conversation, i.e. real time data, that may dictate that the path of the data should be through EU 705 in order to minimize latency. Accordingly one of the data attributes that might be considered is low latency If however the speech is from a recorded message it may be more power efficient to transfer the data through EU 703 and EU 709 and the latency will be immaterial. Using a profiler 733 can make use of the most efficient transfer mechanism given the attributes of the data, in this case latency requirements.

Moreover, the previous description of the disclosed implementations is provided to enable any person skilled in the art to make or use the present disclosure. Various modifications to these implementations will be readily apparent to those skilled in the art, and the generic principles defined herein may be applied to other implementations without departing from the spirit or scope of the disclosure. Thus, the present disclosure is not intended to be limited to the features shown herein but is to be accorded the widest scope consistent with the principles and novel features disclosed herein.

Although the present disclosure and its advantages have been described in detail, it should be understood that various changes, substitutions and alterations can be made herein without departing from the technology of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method of communicating data between electronic units, the method comprising:
   operating a transform selector to select a data transform in a plurality of data transforms based on a destination of data at a first electronics unit, each data transform associated with at least one encoding;
   operating the transform selector to transform the data according to the at least one encoding associated with the selected data transform and based on a set of attributes of the data to form transformed data; and
   operating the first electronics unit to transmit the transformed data on a plurality of bus conductors from the first electronics unit to the destination.

2. The method of claim 1 further comprising:
   operating a second electronics unit associated with the destination to inverse transform the transformed data to recover the data.

3. The method of claim 2 where operating the transform selector to select the data transform in the plurality of data transforms further comprises:
   operating a transform analyzer to determine a power indicator associated with power required to transmit the data over the bus for each data transform in the plurality of data transforms; and
   operating the transform selector to select the data transform according to the power indicator associated with each data transform in the plurality of data transforms.

4. The method of claim 3 wherein operating the transform selector to select the data transform according to the power indicator comprises:
   operating the transform analyzer to evaluate a Hamming distance of the transformed data where the Hamming distance is used as the power indicator.

5. The method of claim 3 wherein operating the transform selector to select the data transform according to the power indicator comprises operating the transform analyzer to evaluate a weighted Hamming distance of the transformed data to form the power indicator.

6. The method of claim 1 further comprising operating a transform indicator to provide an indication of the data transform used to create the transformed data, the indication provided within the transformed data.

7. The method of claim 1, the method further comprising disposing the first electronics unit, the second electronics unit and the bus on an integrated circuit.

8. An apparatus for communicating data between electronic units, the apparatus comprising:
   means for providing data to a first electronics unit;
   means for providing a plurality of data transforms, each data transform associated with at least one encoding;
   means for selecting a data transform in the plurality of data transforms based on a destination of the data;
   means for transforming the data according to the selected data transform's at least one encoding and based on a set of attributes of the data to form transformed data;
   means for providing the transformed data to a bus for transmission to a second electronics unit corresponding to the destination;
   means for transmitting the transformed data over a bus to a second electronics unit;
   means for accepting the transformed data from the bus in the second electronics unit; and
   means for inverse transforming the transformed data to recover the data.

9. An apparatus for communicating data between electronic units, the apparatus comprising:
   a first electronics unit;
   a profiler coupled to the first electronics unit to receive data from the first electronics unit, and to provide transformed data to the first electronics unit, the profiler comprising
   a transform selector to select a data transform in a plurality of data transforms and to apply the selected data transform to encode the data to from the transformed data, wherein the selected data transform depends upon a destination of the data and based on a set of attributes of the data;
   a second electronics unit associated with the destination; and
   a bus, the first electronics unit to send the transformed data by way of the bus to the second electronics unit.

10. The apparatus of claim 9, the second electronics unit coupled to the bus for receiving the transformed data and to apply an inverse of the selected data transform to the received transformed data to recover the data.

11. The apparatus of claim 10 further comprising a transform analyzer for determining an indication of power required to transmit the data over the bus for each selected data transform.

12. The apparatus of claim 11 wherein the transform analyzer comprises circuitry for evaluating a Hamming distance of the transformed data for each selected data transform.

13. The apparatus of claim 12 wherein the circuitry for evaluating the Hamming distance of the transformed data further comprises circuitry for evaluating a weighted Hamming distance of the transformed data.

14. The apparatus of claim 9, the profiler to provide a transform indicator to the first electronics unit, the transform indicator indicating the selected data transform used to create the transformed data.

15. The apparatus of claim 9 wherein the transform indicator includes an indication only of inverse transforms available to the second electronics unit.

16. The apparatus of claim 10 wherein the apparatus includes the first electronics unit, the second electronics unit and the bus disposed on an integrated circuit.

17. The apparatus of claim 9 wherein the transform indicator comprises at least one attribute.

18. A computer-readable non-transitory storage medium comprising instructions that, when executed by a computer, cause the computer to perform a method comprising:
   providing data to a first electronics unit in the computer;
   selecting a data transform in a plurality of data transforms based on a destination of the data, a set of attributes of the data, and a power required to transmit the data transformed by the selected data transform over a bus in the computer to a second electronics unit in the computer;
   transforming the data according to the selected data transform to form a transformed data; and
   providing the transformed data to the bus for transmission to the second electronics unit.

\* \* \* \* \*